US012810852B2

(12) United States Patent
Giovanardi et al.

(10) Patent No.: US 12,810,852 B2
(45) Date of Patent: Nov. 24, 2026

(54) EXTRACTING NEXT STEP SENTENCES FROM A COMMUNICATION SESSION

(71) Applicant: Zoom Communications, Inc., San Jose, CA (US)

(72) Inventors: Davide Giovanardi, Saratoga, CA (US); Zhipeng Guo, Hefei (CN); Vijay Parthasarathy, San Jose, CA (US); Xiaoli Song, Redding, CA (US); Min Xiao-Devins, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 476 days.

(21) Appl. No.: 17/589,827

(22) Filed: Jan. 31, 2022

(65) Prior Publication Data

US 2023/0230586 A1 Jul. 20, 2023

(30) Foreign Application Priority Data

Jan. 20, 2022 (CN) ......................... 202220158739.5

(51) Int. Cl.
*G10L 15/22* (2006.01)
*G10L 15/06* (2013.01)
(Continued)

(52) U.S. Cl.
CPC ............ *G10L 15/19* (2013.01); *G10L 15/063* (2013.01); *G10L 15/1815* (2013.01); *G10L 15/22* (2013.01)

(58) Field of Classification Search
CPC ... G10L 15/19; G10L 15/063; G10L 15/1815; G10L 15/22
See application file for complete search history.

(56) References Cited

U.S. PATENT DOCUMENTS 7,092,871 B2 * 8/2006 Pentheroudakis .... G06F 40/268 704/9
9,460,420 B2 * 10/2016 Hind ....................... H04L 51/04
(Continued)

OTHER PUBLICATIONS

A. Waibel et al., "Advances in automatic meeting record creation and access," 2001 IEEE International Conference on Acoustics, Speech, and Signal Processing. Proceedings (Cat. No.01CH37221), Salt Lake City, UT, USA, 2001, pp. 597-600 vol. 1 (Year: 2001).*
(Continued)

*Primary Examiner* — Bhavesh M Mehta
*Assistant Examiner* — Nandini Subramani

(57) ABSTRACT

Methods and systems provide for extracting next step sentences from a communication session. In one embodiment, the system connects to a communication session involving one or more participants; receives or generates a transcript of a conversation; extracts, from the transcript, a number of utterances including one or more sentences spoken by the participants; identifies a subset of the number of utterances spoken by a subset of the participants associated with a prespecified organization; extracts one or more next step sentences within the subset of the utterances, where the next step sentences each include an owner-action pair structure in which the action is an actionable verb in future tense or present tense; determines a set of analytics data corresponding to the next step sentences and the associated participants; and presents, to one or more users, at least a subset of the analytics data corresponding to the next step sentences.

20 Claims, 8 Drawing Sheets

(51) Int. Cl.
*G10L 15/18* (2013.01)
*G10L 15/19* (2013.01)

(56) References Cited

U.S. PATENT DOCUMENTS

| | | | | |
|---|---|---|---|---|
| 10,552,546 | B2 * | 2/2020 | Nelson | G06F 40/58 |
| 11,095,468 | B1 * | 8/2021 | Pandey | H04L 12/1831 |
| 11,126,793 | B2 * | 9/2021 | Gkotsoulia | G06F 40/163 |
| 11,128,483 | B1 * | 9/2021 | Surazski | G06V 20/30 |
| 11,531,812 | B2 * | 12/2022 | Xia | G06F 40/284 |
| 11,783,829 | B2 * | 10/2023 | Mane | G10L 25/51<br>704/239 |
| 12,380,344 | B2 * | 8/2025 | Hou | G06F 40/174 |
| 2012/0191500 | A1 * | 7/2012 | Byrnes | G06Q 10/1095<br>705/7.19 |
| 2014/0350930 | A1 * | 11/2014 | Cox | G06Q 10/10<br>704/235 |
| 2021/0097502 | A1 * | 4/2021 | Hilleli | G06N 3/08 |
| 2021/0099317 | A1 * | 4/2021 | Hilleli | G06F 40/295 |
| 2022/0207392 | A1 * | 6/2022 | Hou | G10L 15/26 |
| 2022/0253605 | A1 * | 8/2022 | Tan | G06Q 10/1095 |
| 2022/0301557 | A1 * | 9/2022 | Braganza | H04M 3/563 |
| 2023/0163988 | A1 * | 5/2023 | Wells | G06F 16/345<br>715/254 |

OTHER PUBLICATIONS

G. Tur et al., "The CALO Meeting Assistant System," in IEEE Transactions on Audio, Speech, and Language Processing, vol. 18, No. 6, pp. 1601-1611, Aug. 2010 (Year: 2010).*

* cited by examiner

| | |
|---|---|
| 0 | So I can get that quote put together for you, Adam, and I can send it over to you probably within the next. |
| 1 | Let me get you an exact price. |
| 2 | Alright, I'll send you the quote. |
| 3 | I'll send it to you via docusign. |
| 4 | Do you wanna do you want to put on the calendar then for Friday and we can add all the users and everything together? |
| 5 | And I'll send you a bunch of some different training links. |
| 6 | I'll put the quote together, send it over to you |

FIG. 4

| TEXT | LEMMA | POS | TAG | DEP | SHAPE | ALPHA | STOP |
|---|---|---|---|---|---|---|---|
| Apple | apple | PROPN | NNP | nsubj | Xxxxx | True | False |
| is | be | AUX | VBZ | aux | xx | True | True |
| looking | look | VERB | VBG | ROOT | xxxx | True | False |
| at | at | ADP | IN | prep | xx | True | True |
| buying | buy | VERB | VBG | pcomp | xxxx | True | False |
| U.K. | u.k. | PROPN | NNP | compound | X.X. | False | False |
| startup | startup | NOUN | NN | dobj | xxxx | True | False |
| for | for | ADP | IN | prep | xxx | True | True |
| $ | $ | SYM | $ | quantmod | $ | False | False |
| 1 | 1 | NUM | CD | compound | d | False | False |
| billion | billion | NUM | CD | pobj | xxxx | True | False |

FIG. 6

EXTRACTING NEXT STEP SENTENCES FROM A COMMUNICATION SESSION

FIELD OF INVENTION

The present invention relates generally to digital communication, and more particularly, to systems and methods for extracting next step sentences from a communication session.

SUMMARY

The appended claims may serve as a summary of this application.

BRIEF DESCRIPTION OF THE DRAWINGS

The present invention relates generally to digital communication, and more particularly, to systems and methods providing for extracting next step sentences from a communication session.

The present disclosure will become better understood from the detailed description and the drawings, wherein:

FIG. 4 is a diagram illustrating examples of next step sentences found within a transcript for a conversation.

FIG. 6 is a diagram illustrating one example embodiment of part-of-speech tagging for extraction of next step sentences.

DETAILED DESCRIPTION

Figure 1A:
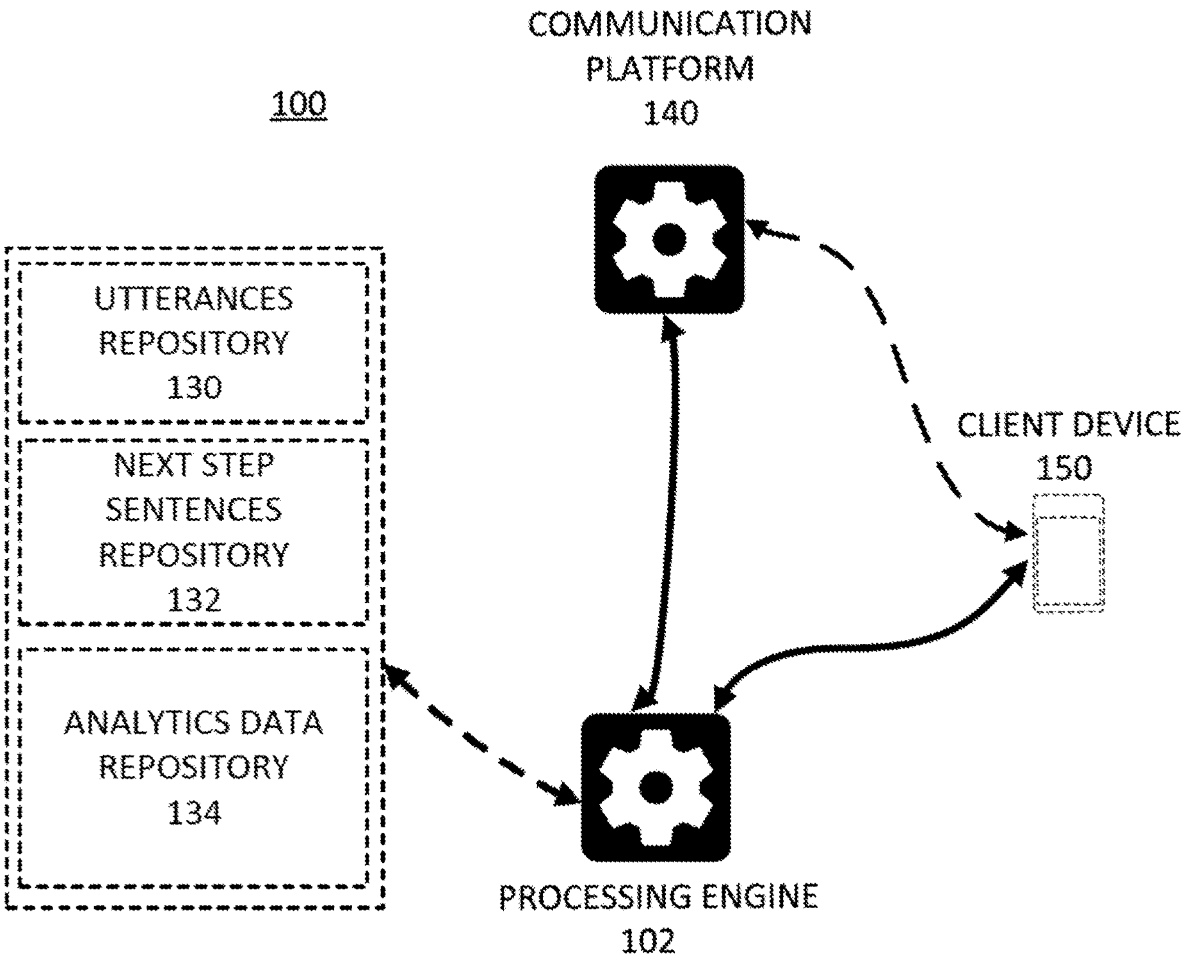
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

One such use case which is currently lacking includes analytics data and metrics around whether team members have discussed "next steps" with a prospective customer. "Next steps" refer to action items the team member indicates will be performed after the meeting, including, e.g., concrete proposals to schedule one or more future meetings, respond to one or more outstanding items or otherwise take one or more actions which will further the progression of the sales relationship in some way or clear barriers toward closing a deal. Knowing whether and how often sales team members utter such phrases as, "I will email the proposal" or "I will get in touch next week to discuss more details" would be useful for measuring and improving the performance and effectiveness of sales meetings and sales team members participating in those meetings.

Thus, there is a need in the field of digital communication tools and platforms to create a new and useful system and method for extracting next step sentences from a communication session in order to present related analytics data. The source of the problem, as discovered by the inventors, is a lack of useful meeting intelligence and analytics data provided to members of an organization with respect to remote communication sessions.

In one embodiment, the system connects to a communication session involving one or more participants; receives or generates a transcript of a conversation between the participants produced during the communication session; extracts, from the transcript, a number of utterances including one or more sentences spoken by the participants; identifies a subset of the number of utterances spoken by a subset of the participants associated with a prespecified organization; extracts one or more next step sentences within the subset of the utterances, where the next step sentences each include an owner-action pair structure in which the action is an actionable verb in future tense or present tense; determines a set of analytics data corresponding to the next step sentences and the participants associated with speaking them; and presents, to one or more users of the communication platform associated with the organization, at least a subset of the analytics data corresponding to the next step sentences.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., an utterances repository 130, next step sentences repository 132, and/or an analytics data repository 134. One or more of the databases may be combined or split into multiple databases. The user's client device 150 in this environment may be a computer, and the communication platform 140 and processing engine I 02 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
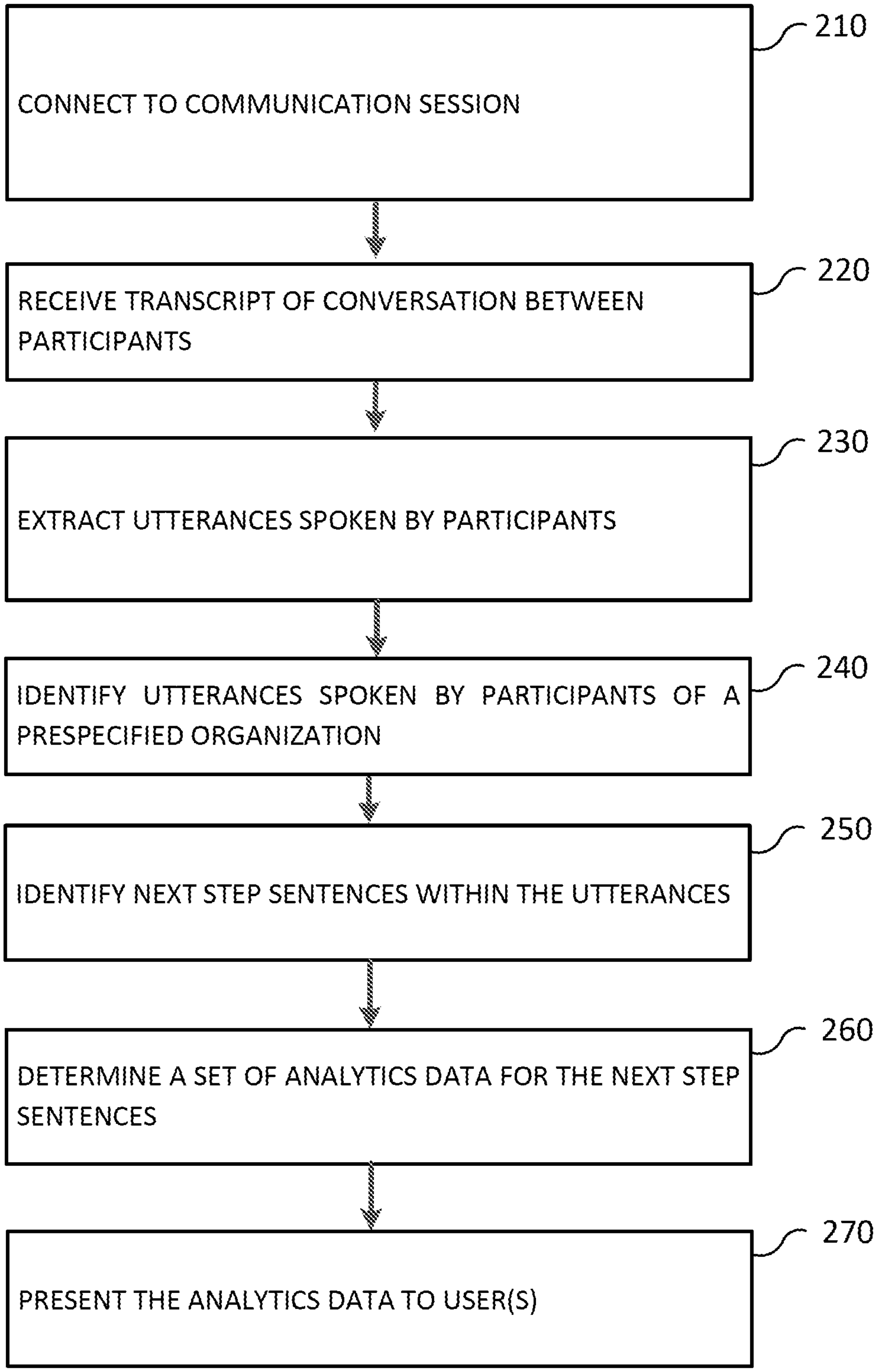
FIG. 2 is a flow chart illustrating an exemplary method that may be performed in some embodiments.

In an embodiment, the processing engine 102 may perform the exemplary method of FIG. 2 or other method herein and, as a result, extract next step sentences from a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include an utterances repository 130, next step sentences repository 132, and/or analytics data repository 134. The optional repositories function to store and/or maintain, respectively, information on utterances within the session; next step sentences which are extracted; and analytics data which relates to next step sentences. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
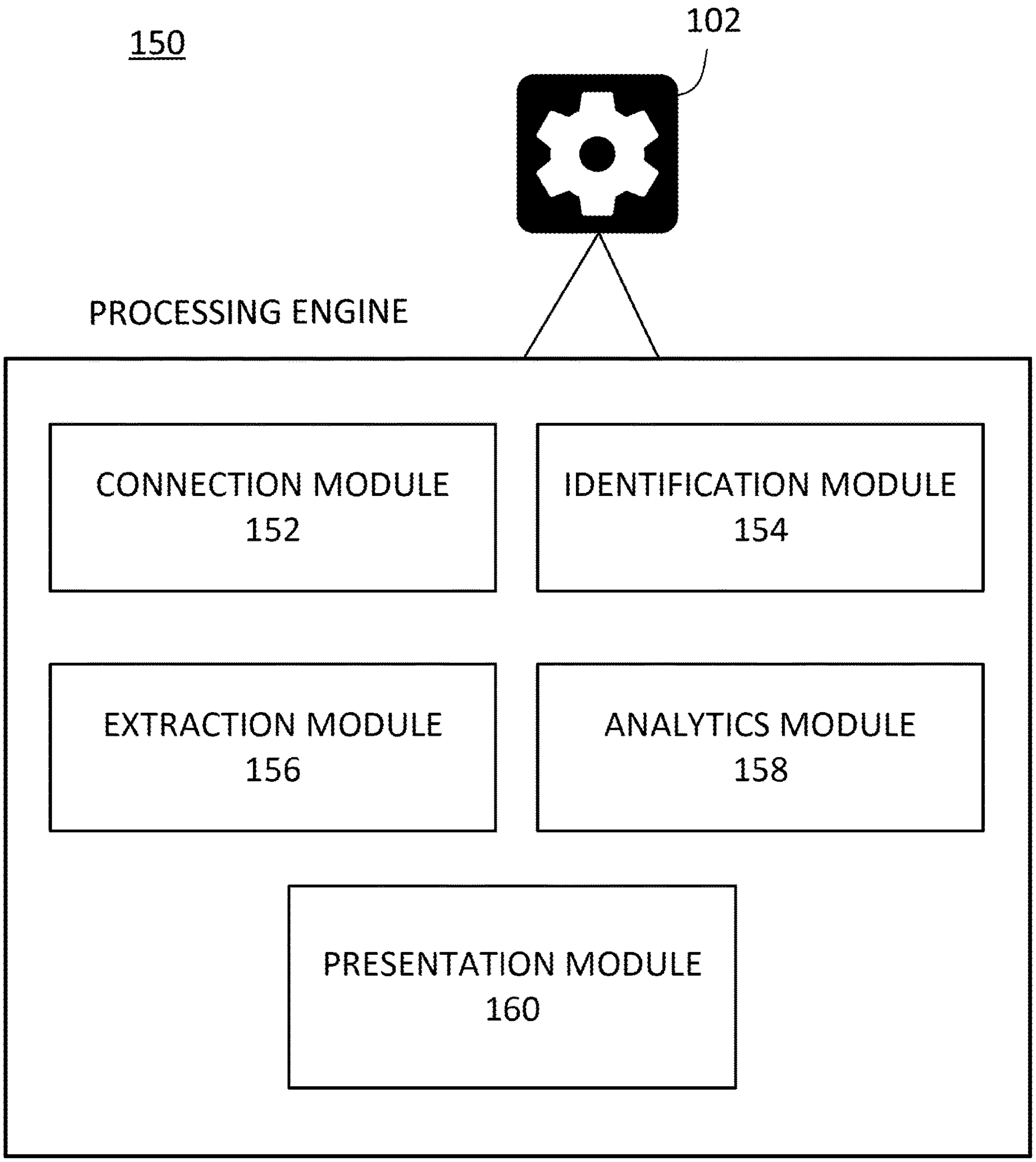
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to connect to a communication session with a number of participants, and receive or generate a transcript of a conversation between the participants produced during the communication session.

Identification module 154 functions to extract, from the transcript, a plurality of utterances each including one or more sentences spoken by the participants, and identify a subset of the utterances spoken by a subset of the participants associated with a prespecified organization.

Extraction module 156 functions to extract next step sentences within the subset of utterances.

Analytics module 158 functions to determine a set of analytics data corresponding to the next step sentences and the participants associated with speaking them.

Presentation module 160 functions to present, to one or more users of the communication platform associated with the organization, at least a subset of the analytics data corresponding to the next step sentences.

The above modules and their functions will be described in further detail in relation to an exemplary method below.

FIG. 2 is a flow chart illustrating an exemplary method that may be performed in some embodiments.

At step 210, the system connects to a communication session (e.g., a remote video session, audio session, chat session, or any other suitable communication session) having a number of participants. In some embodiments, the communication session can be hosted or maintained on a communication platform, which the system maintains a connection to in order to connect to the communication session. In some embodiments, the system displays a UI for each of the participants in the communication session. The UI can include one or more participant windows or participant elements corresponding to video feeds, audio feeds, chat messages, or other aspects of communication from participants to other participants within the communication session.

At step 220, the system receives or generates a transcript of a conversation between the participants produced during the communication session. That is, the conversation which was produced during the communication is used to generate a transcript. The transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript in generated in real-time during the session and also presented in real-time during the session.

At step 230, the system extracts utterances spoken by the participants. Utterances are recognized by the system as one or more sentences attached to a specific speaker of that sentence (i.e., participant). Timestamps, as well as a speaker who uttered the utterance, may be attached to each utterance and/or each sentence. In some embodiments, the transcript itself provides clear demarcation of utterances based on the timestamps which are placed at the start of each utterance. Thus, extracting these utterances may involve extracting the separate utterances which have been demarcated by the timestamps in the transcript.

At step 240, the system identifies a subset of the utterances spoken by a subset of the participants associated with a prespecified organization. In some embodiments, the prespecified organization may be a business entity or company, department, team, organization, or any other suitable organization. In some embodiments, team members may identify themselves and/or one another as members, employees, contractors, or otherwise associated with the organization. In some embodiments, hierarchical relationships between users associated with the organization can be formed due to users explicitly providing such information, via the system implicitly drawing connections based on additional information, or some combination thereof. In some embodiments, a reporting chain of command can be established based on such implicit or explicit hierarchical relationships. In some embodiments, the system identifies that the participant is part of the organization upon the participant logging into the communication platform. In some embodiments, if the domain of the email address associated with the participant is the same email domain as a known member of an organization, they may be presumed to be associated with the organization as well. In some embodiments; within the context of a sales meeting involving sales representatives and prospective customers, the system can use organizational data to determine which participants are sales representatives and which participants are customers. In such a context, the set of analytics data presented in later steps relates to one or more performance metrics for the sales team.

At step 250, the system extracts one or more next step sentences within the subset of the utterances. The next step sentences each include an owner-action pair structure (i.e., as a sentence structure for the sentence in question). Within this owner-action pair structure, the action is an actionable verb in future tense or present tense, but not past tense. In some embodiments, extracting the next step sentences includes identifying a number of linguistic features within each sentence of the utterance, wherein the linguistic features are used to classify the sentence as a next step sentence or a non-next step sentence. Such linguistic features may comprise one or more of, e.g.: words or tokens, lemmas, parts of speech (POS), detailed POS tags, dependencies, morphology, word shapes, alpha characters, and/or words in a stop list.

In some embodiments, the owner within the owner-action pair structure is a first-person pronoun, i.e., the owner will be "I" or equivalent. The first-person pronoun may be either singular or plural. In other embodiments, the owner may be a second or third person pronoun, such as, e.g., "John Doe, please send a follow-up email." In a use case where the meeting is a sales meeting, a first-person pronoun is more likely to be applicable, whereas other meetings may vary on usage of first person, second person, and third person pronouns.

In one example, a rule that next step sentences must include usage of the first person will include one or more of part-of-speech (POS) tagging and/or morphology. The rule for the owner being in first person pronoun form may appear as or similar to, for example:

```
first_person_rule = {
  'POS': 'PRON', # pronoun
  'TAG': 'PRP', # personal
 'MORPH': ['IS_SUPERSET': ['Person=1']} # first person
singular or plural
}
```

In some embodiments, the one or more sentences are further identified as sentences or parts of utterances which are spoken in a latter portion of the duration of the communication session. That is, the system will identify when a next step sentence is uttered toward the end of the session, which gives a much higher likelihood that the sentence actually refers to next steps to be taken as the meeting concludes.

In some embodiments, examples of actionable verbs may be, e.g.: "send", "talk", "check", "email", "shoot", "reach out", "touch base", "schedule", and any other actionable verb which may suggest discussion of next steps. In some embodiments, determining that the action is an actionable verb includes identifying the actionable verb within the sentence based on a list of predetermined actionable verbs. In some embodiments, the list of predetermined actionable verbs is selected based on one or more industries associated with the prespecified organization a subset of the participants belong to.

In some embodiments, the linguistic features may be such that the actionable verb will not be a stative verb nor a sense verb, e.g., next step actionable verbs will not include "be", "notice", "see", "look", "smell", "hear", "appear", "seem", "sound", "like", "want", or similar.

In some embodiments, for example, the rules for actionable verbs may appear as or similar to:

```
action_verb_rule = {
  'POS': 'VERB',
  'LEMMA': {"IN": self. action_verbs}
}
```

In some embodiments, the system specifies the specific constructs that characterize next step sentences by following a number of rules to form a general pattern for next steps discussion within sentences. For example, the sentence "I'm going to send you an email later today" qualifies as a next step sentence, and a rule allows for "going to" to be substituted with "gonna" in similar sentence patterns, as well as "we're" being substituted for "I'm". In some embodiments, POS tagging, morphology, and lemmatization are employed to make such rules and patterns as general as possible.

In some embodiments, in addition to the POS-tagging patterns above, one or more custom rules may be used which may fall outside of the generalized rules for patterns. Such custom rules may be very narrowly applied and specific to next step sentences. For example, one custom rule may be that explicit mentions of terms as "next steps" or "action items" are classified as next step sentences. In another example, verb phrases such as "circle back", "look into", and "get back" are also classified as next step sentences.

In some embodiments, the system trains one or more AI models to extract next step sentences in communication sessions. The extraction of next step sentences is then performed by the one or more AI models. The AI models may be, for example, machine learning ("ML") models, machine vision ("MV") or computer vision models, natural language processing ("NLP") models, or any other suitable AI models.

At step 260, the system determines a set of analytics data corresponding to the next step sentences and the participants associated with speaking them. In some embodiments, the determination is performed by one or more AI models, as described above. Analytics data may include a wide variety of data related to next step sentences. For example, the analytics data may include one or more pieces of data comparing usage of next step sentences by one participant to usage by another participant, or usage by one sales team to another sales team, etc. In some embodiments, aggregate data may be determined for usage of next step sentences across multiple conversations. In some embodiments, next step sentences data may be broken down by topic segment, where topic segments amount to different chapters within the session and may be determined, user-submitted, or a combination thereof.

At step 270, the system presents, to one or more users of the communication platform associated with the organization, at least a subset of the analytics data corresponding to the next step sentences.

In some embodiments, the analytics data is presented at one or more client devices associated with the one or more users. The client device(s) may be configured to display a UI related to the communication platform and/or communication session. In various embodiments, the one or more client devices may be, e.g., one or more desktop computers, smartphones, laptops, tablets, headsets or other wearable devices configured for virtual reality (VR), augmented reality (AR), or mixed reality, or any other suitable client device for displaying such a UI.

In various embodiments, the users presented with the analytics data may be one or more of: one or more participants of the communication session associated with the organization, one or more administrators or hosts of the communication session, one or more users within an organizational reporting chain of participants of the communication session, and/or one or more authorized users within the organization. In some embodiments, users may be authorized for their client devices to receive a UI presenting data on extracted next step sentences if they are granted permission to access, view, and/or modify such data. In some embodiments, a UI for permissions control may be presented to one or more hosts, administrators, or authorized individuals which allows them to customize a number of settings for providing permissions to users with respect to such data. For example, a user authorized to manage permissions controls for a communication session, or all communication sessions for a particular organization, may be able to add participants, remove participants, add, remove, or modify the particular data or types of data which will be presented for such a session, and more.

Figure 3:
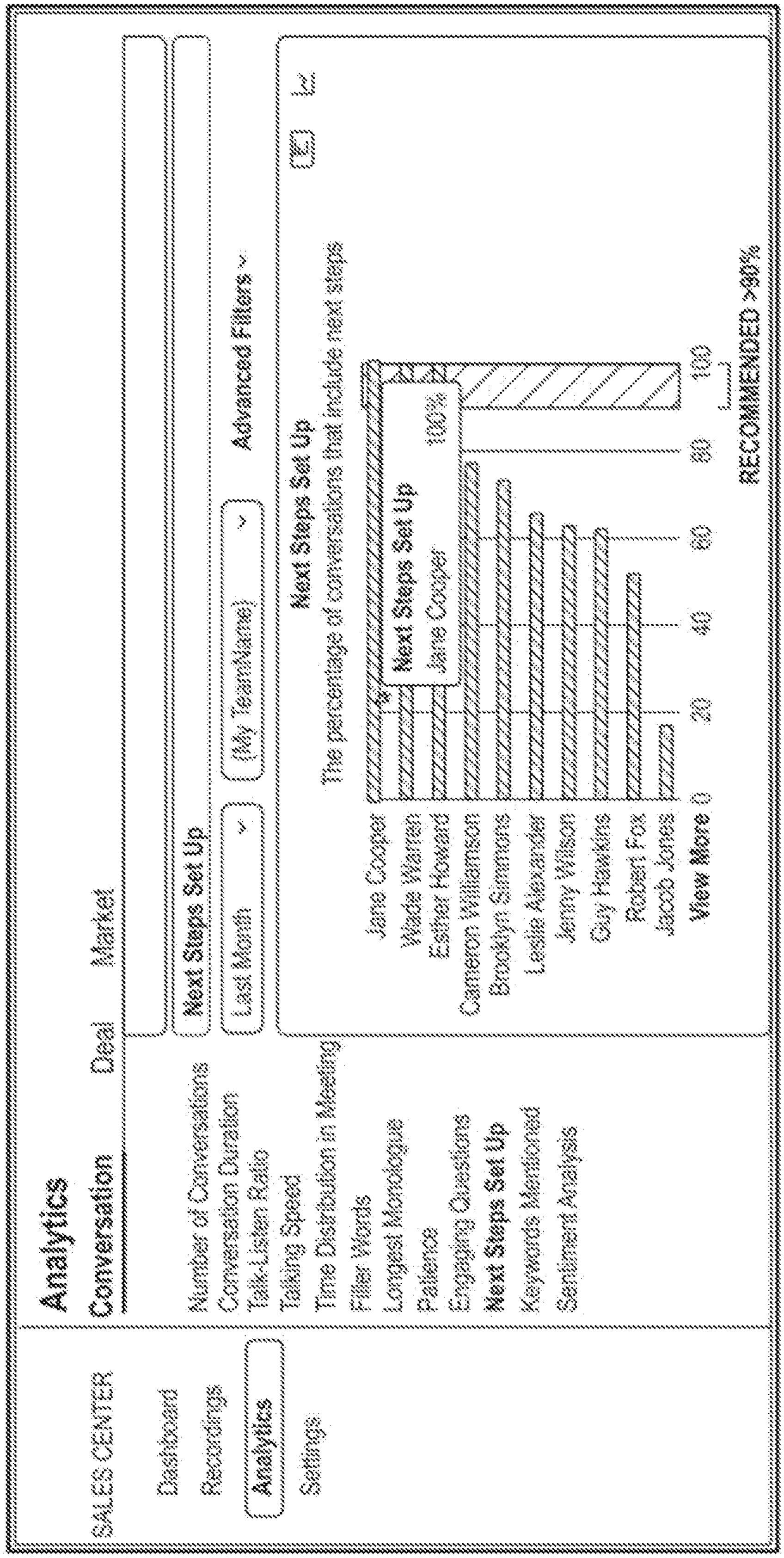
FIG. 3 is a diagram illustrating one example embodiment of a user interface for presenting analytics data related to extracted next steps sentences.

Within this displayed UI presented to the one or more client devices, data corresponding to the extracted next step sentences can be displayed. For example, a UI may be shown which displays aggregate analytics data pertaining to a sales team's meetings with clients over multiple conversations and communication sessions. Within this aggregate analytics data, average next step sentences across conversations can be displayed with respect to the entire team's performance. In some embodiments, data on average next step sentences used during conversations is additionally or alternatively displayed for each individual member of a group. An example of such a UI displayed to client device(s) is illustrated in FIG. 3 and described in further detail below. In some embodiments, rather than aggregate analytics data or data shown for all team members, individual and/or customized analytics data for a particular participant can be viewed, including potentially a wide variety of data for that particular individual.

Figure 5:
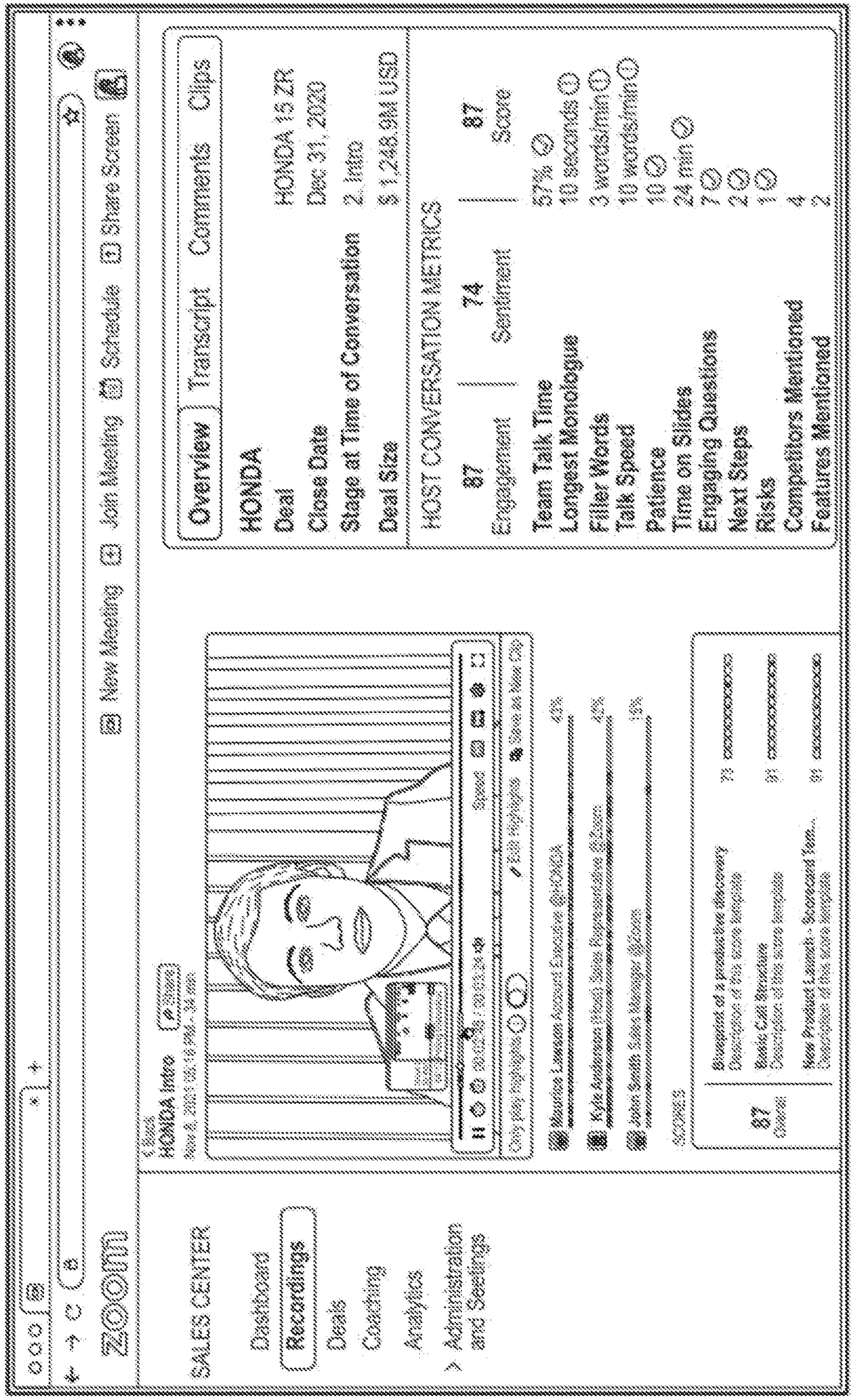
FIG. 5 is a diagram illustrating one example embodiment of a user interface for presenting a count of next step sentences within a conversation.

In some embodiments, the displayed UI may additionally or alternatively present one or more windows which present data with respect to an individual recording, such as the most recent conversation or a currently-in-progress conversation produced in a single given communication session. Users may be able to access a playback recording of the communication session, as well as see various pieces of data with respect to the communication session. In some embodiments, users may be able to view a transcript related to the conversation produced, and instruct the UI to display the detected next step sentences used within the transcript in a highlighted or similar fashion. In some embodiments, a UI element with a playback recording may present one or more pieces of aggregate analytics data or individual analytics data corresponding to the communication session as a whole, the particular topic segment the user is playing back, or any other suitable data which can be presented. An example of such a UI element is illustrated in FIG. 5, described in further detail below.

In some embodiments, the analytics data can be provided for a summary or post-meeting notes to one or more users. For example, data relating to next step analytics can be sent by email in a summary automatically after a meeting, or a follow-up email to one or more participants can be automatically generated for a participant or agent to send.

Post-meeting notes for participants' own personal use may also be automatically generated containing analytics data for next step sentences.

FIG. 3 is a diagram illustrating one example embodiment of a user interface ("UI") for presenting analytics data related to extracted next steps sentences.

Within the illustrated UI, an analytics tab is presented at a display of a client device. A "Conversation" sub-tab is displayed with a number of analytics and metrics related to an aggregate of multiple conversations which participants have participated in within communication sessions for a sales team. One of the analytics elements which can be further navigated to is labeled "Next Steps Set Up", which is currently selected for display within the UI window. This set of analytics data refers to the percentage of conversations that include identified next steps language.

In the example, Jane Cooper, Wade Warren, and Esther Howard have uttered next steps sentences in 100% of the conversations. On the lower end, Jacob Jones has included next steps sentences in less than 20% of the conversations. A "recommended" number below this data shows that a recommended ideal percentage for conversations which include next steps language is over 90%. Thus, within this particular sales team, three participants have met the ideal or target suggested by the analytics tab for the next steps data, while the remaining seven participants have not.

Additionally, filters appear above the data which allow for filtering conversations based on time and team. In this example, conversations from last month are included in the time filter, while the participant's team name is used for the team for which analytics data is displayed. Additional advanced filters may be applied via a drop down box UI element, if desired.

FIG. 4 is a diagram illustrating examples of next step sentences found within a transcript for a conversation.

The illustration shows a chart with 7 examples (0-6) of next step sentences which were detected within an example of a transcript produced for a communication session. Each of the examples shows the full sentence which was detected as a next step sentence. For example, the first detected next step sentence in row 0 reads, "So I can get that quote together for you, Adam, and I can send it over to you probably within the next [day]." In this sentence, both the formulations "I can get that quote" and "I can send it over to you" are detected as next step sentences. In the former, "I" is the first-person pronoun owner, and "get" would be detected as the action verb, with "can get" being detected as future tense. Likewise for the latter, "I" would be the first person pronoun owner in the owner-action pair structure, "send" is the action verb, and "can send" indicates a future tense.

FIG. 5 is a diagram illustrating one example embodiment of a user interface for presenting a count of next step sentences within a conversation.

Within the illustrated UI, a "Recordings" tab is presented at a display of a client device. Information about a specific recording of a communication session is displayed, including a video of the recording itself which can be played back in various ways or adjusted to skip to different times or topics within the video. A timeline allows the user to skip to different topic, and when the user hovers over a topic, a timestamp as well as a topic segment name is displayed.

On the right side of the window, a number of aggregate analytics data and/or metrics for the entire sales team are displayed with respect to the one, specific recording and communication session, including a "Next Steps" metric for the entire team. The Next Steps metric shows the data for the entire team in terms of the number of next step sentences used throughout the conversation, which in this example is 2 next step sentences. Next to this data, an icon with a checkmark is displayed, indicating that this number of next step sentences used falls within a recommended number of next step sentences to be used in the conversation. In some embodiments, the recommended number is predetermined and fixed, while in other embodiments, the recommended number may be based on one or more recommendation criteria, such as the past performance of the team, recommended performances for the industry, an aggregate recommended performance for the combination of participants involved based on individual participant recommended performances, or any other such suitable criteria for generating a recommended number for the metric.

Directly below the video playback UI element, a list of participants is shown for a particular topic segment, with data relating to each. The information presented for each participant, as well as the order of participants, may change based on the topic segment currently being played or currently skipped to. In some embodiments, a user may be able to click on his own name from this list, or potentially other participants, to receive individualized and/or customized analytics data pertaining to him or her in particular. For example, the next step sentences uttered by just that participant may be displayed, or both the individual data for that participant as well as the aggregate data so that the participant can compare their own performance with respect to the total sales team involved in the conversation.

In some embodiments, this UI for the recording may additionally or alternatively show such metrics, including the "Next Steps" individual or aggregate data, for a particular topic within the conversation, depending on where in the video recording the participant has skipped to or is currently playing back. For example, if the user skips to timestamp 04:12 in the recording, which is labeled with topic segment "Pricing Discussion", then the UI may additionally or alternatively show the number of next step sentences used that is calculated for that topic segment alone. In this way, users, e.g., sales teams and their individual sales representatives, can view analytics data on their performance for each individual topic, not just as a whole for the recording or across multiple conversations. This can be useful, for example, if a sales representative learns via the data that they use next step sentences relatively rarely during a concluding farewell segment of the discussion, which may introduce a negative effect on customer sentiment as they conclude the discussion or immediately after. The participant may then be able to correct this to increase the amount of next step sentences used during the concluding portions of discussions, thus improving his or her sales performance and leading to better sales results.

FIG. 6 is a diagram illustrating one example embodiment of part-of-speech tagging for extraction of next step sentences. In some embodiments, extracting the next step sentences within the subset of the utterances can include identifying a number of linguistic features within each sentence of the utterance, where the linguistic features are used to classify the sentence as a next step sentence or a non-next step sentence. In some embodiments, such linguistic features can include one or more, e.g., words or tokens, lemmas, parts of speech, detailed POS tags, dependencies, word shapes, alpha characters, and/or words in a stop list.

In some embodiments, the system parses and tags sentences within the utterances from speakers identified in the transcript. In some embodiments, one or more trained models and/or statistical models can be configured to predict which tag or label of a model applies next in a sentence, given the learned context. In some embodiments, such models are trained on training data which includes enough examples for the model to make predictions that generalize across the language being used. For example, such a trained model may recognize that a word following "the" in English is most likely a noun.

The illustrated examples show tokens (in rows) within a sentence, and labels applied for various characteristics and traits for those tokens, including, e.g.: the text of the token itself, the lemma or base form of the word, simple POS tag, detailed POS tag, syntactic dependency or relation between tokens, the word shape (e.g., capitalization, punctuation, digits), whether the token is an alpha character, and whether the token is part of a stop list containing, i.e., the most common words in the language. In various embodiments, the system can extract some or all of such data from tokens found within sentences of a transcript. This data can then be used to for extraction of next step sentences, including, e.g., determining that a sentence includes an owner-action pair structure where the owner is a first-person pronoun and the action is an actionable verb in future tense or present tense. Such determinations can be based on the parts-of-speech simple or detailed tags, the dependencies between words, and more.

Figure 7:
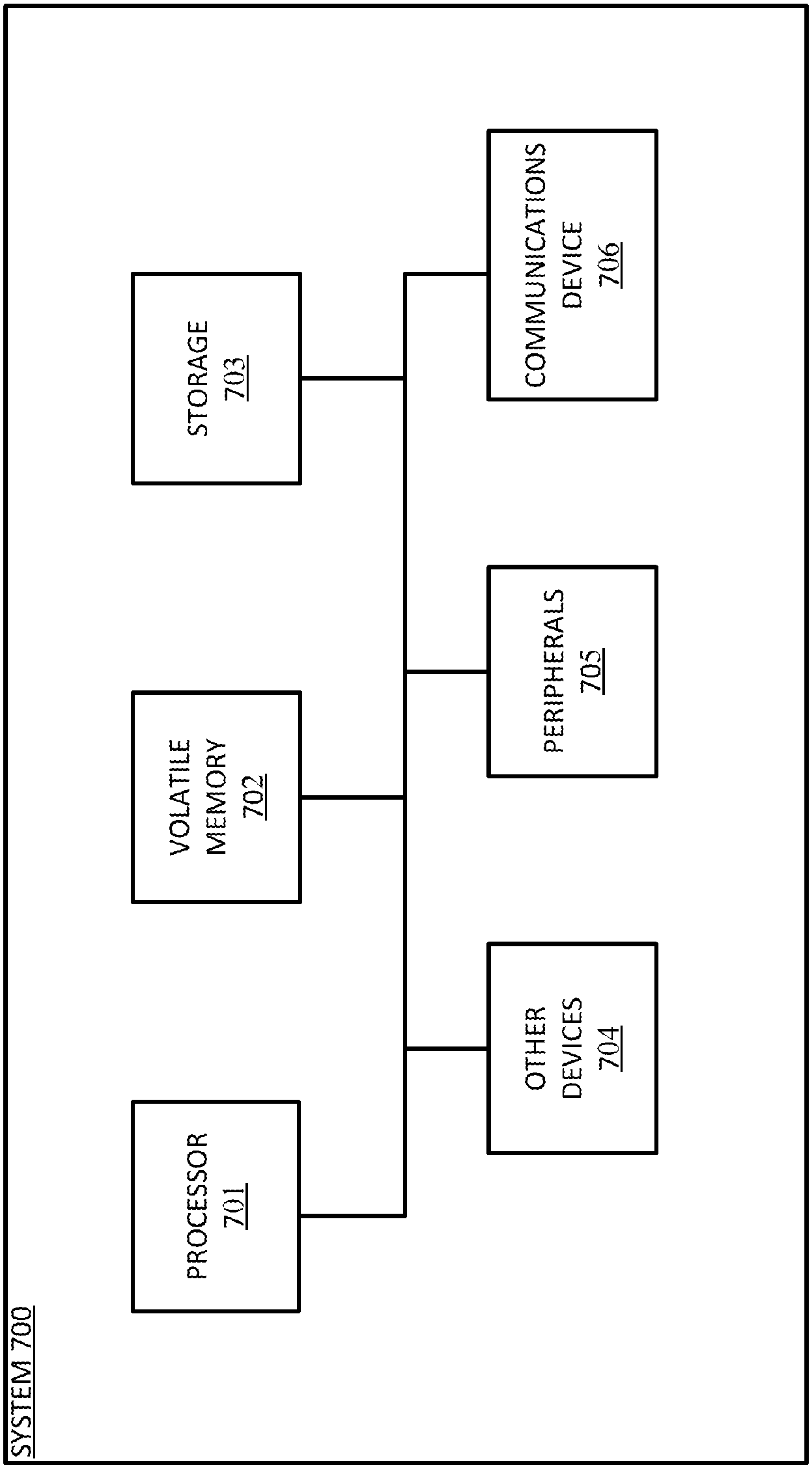
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1. A method, comprising: connecting to a communication session involving one or more participants; receiving or generating a transcript of a conversation between the participants produced during the communication session; extracting, from the transcript, a plurality of utterances comprising one or more sentences spoken by the participants; identifying a subset of the plurality of utterances spoken by a subset of the participants associated with a prespecified organization; extracting one or more next step sentences within the subset of the utterances, the next step sentences each comprising an owner-action pair structure where the action is an actionable verb in future tense or present tense; determining a set of analytics data corresponding to the next step sentences and the participants associated with speaking them; and presenting, to one or more users of the communication platform associated with the organization, at least a subset of the analytics data corresponding to the next step sentences.

Example 2. The method of Example 1, wherein the owner in the owner-action pair structure is a first-person pronoun.

Example 3. The method of any of Examples 1-2, wherein: the transcript is received or generated in real time while the communication session is underway, and the analytics data is presented in real time to the users or participants associated with the organization while the communication session is underway.

Example 4. The method of any of Examples 1-3, further comprising: training one or more artificial intelligence (AI) models to extract next step sentences in communication sessions, wherein extracting the one or more next step sentences within the subset of the utterances is performed by the one or more AI models.

Example 5. The method of Example 4, wherein at least a subset of the one or more AI models are trained to extract next step sentences in a plurality of languages.

Example 6. The method of any of Examples 1-5, wherein: the communication session is a sales session with one or more prospective customers, the prespecified organization is a sales team, and the set of analytics data relates to one or more performance metrics for the sales team.

Example 7. The method of any of Examples 1-6, further comprising: determining that the one or more sentences are spoken in a latter portion of the duration of the communication session based on one or more timestamps associated with the utterances or sentences.

Example 8. The method of any of Examples 1-7, further comprising: receiving one or more topic segments for the communication session and their respective timestamps, and determining the latter portion of the duration of the communication session to be one or more of the topic segments.

Example 9. The method of any of Examples 1-8, wherein determining that the action is an actionable verb comprises: identifying the actionable verb within the sentence based on a list of predetermined actionable verbs.

Example 10. The method of Example 9, wherein the list of predetermined actionable verbs is selected based on one or more industries associated with the prespecified organization.

Example 11. The method of any of Examples 1-10, wherein the users of the communication platform associated with the organization whom are presented with the subset of analytics data comprise one or more of: one or more participants of the communication session associated with the organization, one or more administrators or hosts of the communication session, one or more users within an organizational reporting chain of participants of the communication session, and/or one or more authorized users within the organization.

Example 12. The method of any of Examples 1-11, wherein the transcript of the conversation is generated via one or more automatic speech recognition (ASR) techniques.

Example 13. The method of any of Examples 1-12, further comprising: presenting, to the one or more users of the communication platform associated with the organization, the transcript of the conversation with highlighted sections comprising next step sentences.

Example 14. The method of any of Examples 1-13, wherein extracting the one or more next step sentences within the subset of the utterances comprises identifying a plurality of linguistic features within each sentence of the utterance, wherein the linguistic features are used to classify the sentence as a next step sentence or a non-next step sentence.

Example 15. The method of Example 14, wherein the linguistic features comprise one or more of: words or tokens, lemmas, parts of speech (POS), detailed POS tags, dependencies, word shapes, alpha characters, morphology, and/or words in a stop list.

Example 16. The method of any of Examples 1-15, wherein the one or more processors are further configured to perform the operation of: training one or more artificial intelligence (AI) models to extract next step sentences in communication sessions, wherein extracting the one or more next step sentences within the subset of the utterances is performed by the one or more AI models.

Example 17. The communication system of Example 16, wherein at least a subset of the one or more AI models are trained to extract next step sentences in a plurality of languages.

Example 18. The method of any of Examples 1-17, wherein: the communication session is a sales session with one or more prospective customers, the prespecified organization is a sales team, and the set of analytics data relates to one or more performance metrics for the sales team.

Example 19. A communication system comprising one or more processors configured to perform the operations of: connecting to a communication session involving one or more participants; receiving or generating a transcript of a conversation between the participants produced during the communication session; extracting, from the transcript, a plurality of utterances comprising one or more sentences spoken by the participants; identifying a subset of the plurality of utterances spoken by a subset of the participants associated with a prespecified organization; extracting one or more next step sentences within the subset of the utterances, the next step sentences each comprising an owner-action pair structure where the action is an actionable verb in future tense or present tense; determining a set of analytics data corresponding to the next step sentences and the participants associated with speaking them; and presenting, to one or more users of the communication platform associated with the organization, at least a subset of the analytics data corresponding to the next step sentences.

Example 20. The communication system of Example 19, wherein the one or more processors are further configured to perform the operation of: training one or more artificial intelligence (AI) models to extract next step sentences in communication sessions, wherein extracting the one or more next step sentences within the subset of the utterances is performed by the one or more AI models.

Example 21. The communication system of any of Examples 19-20, wherein: the communication session is a sales session with one or more prospective customers, the prespecified organization is a sales team, and the set of analytics data relates to one or more performance metrics for the sales team.

Example 22. The communication system of Example 21, wherein the owner in the owner-action pair structure is a first-person pronoun.

Example 23. The communication system of any of Examples 19-22, wherein: the transcript is received or generated in real time while the communication session is underway, and the analytics data is presented in real time to the users or participants associated with the organization while the communication session is underway.

Example 24. The communication system of any of Examples 19-23, further comprising: training one or more artificial intelligence (AI) models to extract next step sentences in communication sessions, wherein extracting the one or more next step sentences within the subset of the utterances is performed by the one or more AI models.

Example 25. The communication system of Example 24, wherein at least a subset of the one or more AI models are trained to extract next step sentences in a plurality of languages.

Example 26. The communication system of any of Examples 19-25, wherein: the communication session is a sales session with one or more prospective customers, the prespecified organization is a sales team, and the set of analytics data relates to one or more performance metrics for the sales team.

Example 27. The communication system of any of Examples 19-26, further comprising: determining that the one or more sentences are spoken in a latter portion of the duration of the communication session based on one or more timestamps associated with the utterances or sentences.

Example 28. The communication system of any of Examples 19-27, further comprising: receiving one or more topic segments for the communication session and their respective timestamps, and determining the latter portion of the duration of the communication session to be one or more of the topic segments.

Example 29. The communication system of any of Examples 19-28, wherein determining that the action is an actionable verb comprises: identifying the actionable verb within the sentence based on a list of predetermined actionable verbs.

Example 30. The communication system of Example 29, wherein the list of predetermined actionable verbs is selected based on one or more industries associated with the prespecified organization.

Example 31. The communication system of any of Examples 19-30, wherein the users of the communication platform associated with the organization whom are presented with the subset of analytics data comprise one or more of: one or more participants of the communication session associated with the organization, one or more administrators or hosts of the communication session, one or more users within an organizational reporting chain of participants of the communication session, and/or one or more authorized users within the organization.

Example 32. The communication system of any of Examples 19-31, wherein the transcript of the conversation is generated via one or more automatic speech recognition (ASR) techniques.

Example 33. The communication system of any of Examples 19-32, further comprising: presenting, to the one or more users of the communication platform associated with the organization, the transcript of the conversation with highlighted sections comprising next step sentences.

Example 34. The communication system of any of Examples 19-33, wherein extracting the one or more next step sentences within the subset of the utterances comprises identifying a plurality of linguistic features within each sentence of the utterance, wherein the linguistic features are used to classify the sentence as a next step sentence or a non-next step sentence.

Example 35. The communication system of Example 34, wherein the linguistic features comprise one or more of: words or tokens, lemmas, parts of speech (POS), detailed POS tags, dependencies, word shapes, alpha characters, morphology, and/or words in a stop list.

Example 36. A non-transitory computer-readable medium containing instructions for generating a note with session content from a communication session, comprising: instructions for connecting to a communication session involving one or more participants; instructions for receiving or generating a transcript of a conversation between the participants produced during the communication session; instructions for extracting, from the transcript, a plurality of utterances comprising one or more sentences spoken by the participants; instructions for identifying a subset of the plurality of utterances spoken by a subset of the participants associated with a prespecified organization; instructions for extracting one or more next step sentences within the subset of the utterances, the next step sentences each comprising an owner-action pair structure where the action is an actionable verb in future tense or present tense; instructions for determining a set of analytics data corresponding to the next step sentences and the participants associated with speaking them; and instructions for presenting, to one or more users of the communication platform associated with the organization, at least a subset of the analytics data corresponding to the next step sentences.

Example 37. The non-transitory computer-readable medium of Example 36, wherein the owner in the owner-action pair structure is a first-person pronoun.

Example 38. The non-transitory computer-readable medium of any of Examples 36-37, wherein: the transcript is received or generated in real time while the communication session is underway, and the analytics data is presented in real time to the users or participants associated with the organization while the communication session is underway.

Example 39. The non-transitory computer-readable medium of any of Examples 36-38, further comprising: training one or more artificial intelligence (AI) models to extract next step sentences in communication sessions, wherein extracting the one or more next step sentences within the subset of the utterances is performed by the one or more AI models.

Example 40. The non-transitory computer-readable medium of Example 39, wherein at least a subset of the one or more AI models are trained to extract next step sentences in a plurality of languages.

Example 41. The non-transitory computer-readable medium of any of Examples 36-40, wherein: the communication session is a sales session with one or more prospective customers, the prespecified organization is a sales team, and the set of analytics data relates to one or more performance metrics for the sales team.

Example 42. The non-transitory computer-readable medium of any of Examples 36-41, further comprising: determining that the one or more sentences are spoken in a latter portion of the duration of the communication session based on one or more timestamps associated with the utterances or sentences.

Example 43. The non-transitory computer-readable medium of any of Examples 36-42, further comprising: receiving one or more topic segments for the communication session and their respective timestamps, and determining the latter portion of the duration of the communication session to be one or more of the topic segments.

Example 44. The non-transitory computer-readable medium of any of Examples 36-43, wherein determining that the action is an actionable verb comprises: identifying the actionable verb within the sentence based on a list of predetermined actionable verbs.

Example 45. The non-transitory computer-readable medium of any of Examples 36-44, wherein the list of predetermined actionable verbs is selected based on one or more industries associated with the prespecified organization.

Example 46. The non-transitory computer-readable medium of any of Examples 36-45, wherein the users of the communication platform associated with the organization whom are presented with the subset of analytics data comprise one or more of: one or more participants of the communication session associated with the organization, one or more administrators or hosts of the communication session, one or more users within an organizational reporting chain of participants of the communication session, and/or one or more authorized users within the organization.

Example 47. The non-transitory computer-readable medium of any of Examples 36-46, wherein the transcript of the conversation is generated via one or more automatic speech recognition (ASR) techniques.

Example 48. The non-transitory computer-readable medium of any of Examples 36-47, presenting, to the one or more users of the communication platform associated with the organization, the transcript of the conversation with highlighted sections comprising next step sentences.

Example 49. The non-transitory computer-readable medium of any of Examples 36-48, wherein extracting the one or more next step sentences within the subset of the utterances comprises identifying a plurality of linguistic features within each sentence of the utterance, wherein the linguistic features are used to classify the sentence as a next step sentence or a non-next step sentence.

Example 50. The non-transitory computer-readable medium of any of Examples 36-49, wherein the one or more processors are further configured to perform the operation of: training one or more artificial intelligence (AI) models to extract next step sentences in communication sessions, wherein extracting the one or more next step sentences within the subset of the utterances is performed by the one or more AI models.

Example 51. The non-transitory computer-readable medium of Example 50, wherein at least a subset of the one or more AI models are trained to extract next step sentences in a plurality of languages.

Example 52. The non-transitory computer-readable medium of any of Examples 36-51, wherein: the communication session is a sales session with one or more prospective customers, the prespecified organization is a sales team, and the set of analytics data relates to one or more performance metrics for the sales team.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:

facilitating a communication session between one or more client devices, each client device associated with a respective participant;

recording a video of the communication session;

generating a transcript of a conversation between the respective participants produced during the communication session;

extracting, from the transcript, a plurality of utterances comprising one or more sentences spoken by the respective participants;

identifying topics from the plurality of utterances;

embedding a topic segment name for each identified topic in the recording of the video;

associating each topic segment name to a respective timestamp of the video;

identifying a subset of the plurality of utterances spoken by a subset of the respective participants associated with a prespecified organization;

extracting one or more next step sentences within the subset of the plurality of utterances using an artificial intelligence (AI) model, wherein each next step sentence is identified by the AI model as comprising an owner that is a first-person pronoun and an actionable verb in future tense or present tense, wherein the actionable verb is selected from a dynamically generated industry-specific list of actionable verbs, and wherein the AI model is trained using meeting data from a predetermined organizational industry, and wherein the AI model classifies each sentence as a next step sentence based on linguistic features comprising at least parts of speech (POS) tags, dependencies, and one or more of: word shapes, alpha characters, morphology, and stop list words;

counting each next step sentence corresponding to each participant of the subset of the respective participants;

determining a set of analytics data corresponding to the one or more next step sentences and the respective participants associated with speaking them, wherein the set of analytics data includes, for each participant, a count of next step sentences, a breakdown by topic segment, and a breakdown by time segment of the session, and wherein the analytics data is presented in real-time during the session;

generating a user interface (UI) that includes, for each next step sentence, a direct link to the corresponding video timestamp and a visual highlight of the sentence within the transcript, wherein the UI is generated and updated in real-time during the session to present the analytics data, and wherein the UI is configurable to filter analytics by participant, topic, and time segment; and transmitting the UI to the one or more client devices for display on respective displays of each of the one or more client devices.

2. The method of claim 1, further comprising:

identifying, within an owner-action pair structure of each next step sentence, the owner as one of a first-person singular pronoun or a first-person plural pronoun; and associating the next step sentence with the participant identified as the owner based on the identified pronoun.

3. The method of claim 1, wherein:

the transcript is received or generated in real time while the communication session is underway, and the set of analytics data is presented in real time to users or participants associated with the prespecified organization while the communication session is underway.

4. The method of claim 1, wherein at least a subset of the one or more AI models are trained to extract next step sentences in a plurality of languages.

5. The method of claim 1, wherein:

the communication session is a sales session with one or more prospective customers, the prespecified organization is a sales team, and the set of analytics data relates to one or more performance metrics for the sales team.

6. The method of claim 1, further comprising:

determining that the one or more sentences are spoken in a latter portion of a duration of the communication session based on one or more timestamps associated with the plurality of utterances or sentences.

7. The method of claim 1, further comprising:

receiving one or more topic segments for the communication session and their respective timestamps, and determining a latter portion of a duration of the communication session to be one or more of the topic segments.

8. The method of claim 1, further comprising:

identifying the actionable verb within a sentence based on a list of predetermined actionable verbs.

9. The method of claim 8, wherein the list of predetermined actionable verbs is selected based on one or more industries associated with the prespecified organization.

10. The method of claim 1, wherein users of a communication platform associated with the prespecified organization whom are presented with the subset of analytics data comprise one or more of: one or more participants of the communication session associated with the prespecified organization, one or more administrators or hosts of the communication session, one or more users within an organizational reporting chain of participants of the communication session, and/or one or more authorized users within the prespecified organization.

11. The method of claim 1, wherein the transcript of the conversation is generated via one or more automatic speech recognition (ASR) techniques.

12. The method of claim 1, further comprising:

presenting, to one or more users of a communication platform associated with the prespecified organization, the transcript of the conversation with highlighted sections comprising next step sentences.

13. The method of claim 1, wherein extracting the one or more next step sentences further comprises applying one or more custom classification rules to the plurality of utterances, wherein the custom classification rules classify a sentence as a next step sentence based on one or more of: an explicit mention of a term "next steps" or "action items" within the sentence, or a presence of a verb phrase comprising "circle back," "look into," or "get back" within the sentence.

14. The method of claim 1, further comprising:

generating and transmitting to one or more users a post-session summary comprising the one or more next step sentences and the analytics data corresponding thereto, wherein the post-session summary is one or more of: automatically transmitted by email to one or more participants following conclusion of the communication session, or automatically generated as personal post-meeting notes for one or more participants.

15. The method of claim 1, further comprising:

training one or more AI models to extract next step sentences in communication sessions provided by a communication platform.

16. A communication system comprising:

one or more processors configured to:

facilitate a communication session between one or more client devices, each client device associated with a respective participant;

record a video of the communication session;

generate a transcript of a conversation between the respective participants produced during the communication session;

extract, from the transcript, a plurality of utterances comprising one or more sentences spoken by the respective participants;

identify topics from the plurality of utterances;

embed a topic segment name for each identified topic in the recording of the video;

associate each topic segment name to a respective timestamp of the video;

identify a subset of the plurality of utterances spoken by a subset of the respective participants associated with a prespecified organization;

extract one or more next step sentences within the subset of the plurality of utterances using an artificial intelligence (AI) model, wherein each next step sentence is identified by the AI model as comprising an owner that is a first person pronoun and an actionable verb in future tense or present tense, wherein the actionable verb is selected from a dynamically generated industry specific list of actionable verbs, and wherein the AI model is trained using meeting data from a predetermined organizational industry and wherein the AI model classifies each sentence as a next step sentence based on linguistic features comprising at least parts of speech (POS) tags, dependencies, and one or more of: word shapes, alpha characters, morphology, and stop list words;

count each next step sentence corresponding to each participant of the subset of the respective participants;

determine a set of analytics data corresponding to the one or more next step sentences and the respective participants associated with speaking them, wherein the set of analytics data includes, for each participant, a count of next step sentences, a breakdown by topic segment, and a breakdown by time segment of the session, and wherein the analytics data is presented in real-time during the session;

generate a user interface (UI) that includes, for each next step sentence, a direct link to the corresponding video timestamp and a visual highlight of the sentence within the transcript, wherein the UI is generated and updated in real-time during the session to present the analytics data, and wherein the UI is configurable to filter analytics by participant, topic, and time segment; and transmit the UI to the one or more client devices for display on respective displays of each of the one or more client devices.

17. The communication system of claim 16, wherein at least a subset of the one or more AI models are trained to extract next step sentences in a plurality of languages.

18. The communication system of claim 16, wherein:

the communication session is a sales session with one or more prospective customers, the prespecified organization is a sales team, and the set of analytics data relates to one or more performance metrics for the sales team.

19. A non-transitory computer-readable medium containing instructions that when executed by a processor, cause the processor to perform operations, comprising:

facilitating a communication session between one or more client devices, each client device associated with a respective participant;

recording a video of the communication session;

generating a transcript of a conversation between the respective participants produced during the communication session;

extracting, from the transcript, a plurality of utterances comprising one or more sentences spoken by the respective participants;

identifying topics from the plurality of utterances;

embedding a topic segment name for each identified topic in the recording of the video;

associating each topic segment name to a respective timestamp of the video;

identifying a subset of the plurality of utterances spoken by a subset of the respective participants associated with a prespecified organization;

extracting one or more next step sentences within the subset of the plurality of utterances using an artificial intelligence (AI) model, wherein each next step sentence is identified by the AI model as comprising an owner that is a first-person pronoun and an actionable verb in future tense or present tense, wherein the actionable verb is selected from a dynamically generated industry-specific list of actionable verbs, and wherein the AI model is trained using meeting data from a predetermined organizational industry, and wherein the AI model classifies each sentence as a next step sentence based on linguistic features comprising at least parts of speech (POS) tags, dependencies, and one or more of: word shapes, alpha characters, morphology, and stop list words;

counting each next step sentence corresponding to each participant of the subset of the respective participants;

determining a set of analytics data corresponding to the one or more next step sentences and the respective participants associated with speaking them, wherein the set of analytics data includes, for each participant, a count of next step sentences, a breakdown by topic segment, and a breakdown by time segment of the session, and wherein the analytics data is presented in real-time during the session;

generating a user interface (UI) that includes, for each next step sentence, a direct link to the corresponding video timestamp and a visual highlight of the sentence within the transcript, wherein the UI is generated and updated in real-time during the session to present the analytics data, and wherein the UI is configurable to filter analytics by participant, topic, and time segment; and transmitting the UI to one or more client devices for display on respective displays of each of the one or more client devices.

20. The system of claim 16, wherein the one or more processors are further configured to:

train one or more AI models to extract next step sentences in communication sessions provided by a communication platform.

* * * * *